(12) United States Patent
Zhou

(10) Patent No.: US 8,737,054 B2
(45) Date of Patent: May 27, 2014

(54) MOUNTING APPARATUS FOR EXPANSION CARDS

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 84 days.

(21) Appl. No.: 13/308,563

(22) Filed: Dec. 1, 2011

(65) Prior Publication Data

US 2013/0107441 A1 May 2, 2013

(30) Foreign Application Priority Data

Oct. 31, 2011 (CN) .......................... 2011 1 0337273

(51) Int. Cl.
*H05K 7/00* (2006.01)

(52) U.S. Cl.
USPC ........................ 361/679.32; 361/802; 361/801

(58) Field of Classification Search
USPC ............. 361/679.4, 740, 741, 756, 809, 728, 361/737, 747, 743, 732, 730, 729, 801, 802, 361/679.32, 679.01
See application file for complete search history.

(56) References Cited

U.S. PATENT DOCUMENTS

| | | | | |
|---|---|---|---|---|
| 5,909,359 A | * | 6/1999 | Summers et al. | 361/748 |
| 7,381,081 B2 | * | 6/2008 | Zhang et al. | 439/377 |
| 7,525,815 B2 | * | 4/2009 | Chen et al. | 361/788 |
| 7,920,388 B2 | * | 4/2011 | Huang | 361/802 |
| 2012/0162933 A1 | * | 6/2012 | Chen et al. | 361/748 |
| 2012/0281373 A1 | * | 11/2012 | Bohannon et al. | 361/756 |
| 2012/0320511 A1 | * | 12/2012 | Tan | 361/679.4 |
| 2013/0148286 A1 | * | 6/2013 | Liu et al. | 361/679.32 |

* cited by examiner

*Primary Examiner* — Lisa Lea Edmonds
*Assistant Examiner* — Keith Depew
(74) *Attorney, Agent, or Firm* — Novak Druce Connolly Bove + Quigg LLP

(57) ABSTRACT

A mounting apparatus for an expansion card includes a fixing bracket receiving the expansion card, and a supporting member mounted to the fixing bracket. The fixing bracket includes an end plate fixing a rear end of the expansion card. The supporting member includes a support wall substantially parallel to the end plate of the fixing bracket. The support wall includes a holding portion to retain a front end of the expansion card. The supporting member is slidable to render the distance between the supporting member and the end plate of the fixing bracket substantially equal to the lengths of various expansion cards.

9 Claims, 4 Drawing Sheets

MOUNTING APPARATUS FOR EXPANSION CARDS

BACKGROUND

1. Technical Field

The present disclosure relates to an apparatus for mounting expansion cards.

2. Description of Related Art

Expansion cards are generally installed in a chassis of an electronic device, such as a computer or a server, with the front ends of the expansion cards fixed to the chassis. When the expansion cards are horizontally placed in the chassis, the rear ends of the expansion cards may be supported with an anti-sag support apparatus. However, the anti-sag support apparatus has a particular size and may not function properly in relation to an expansion card of a different size.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
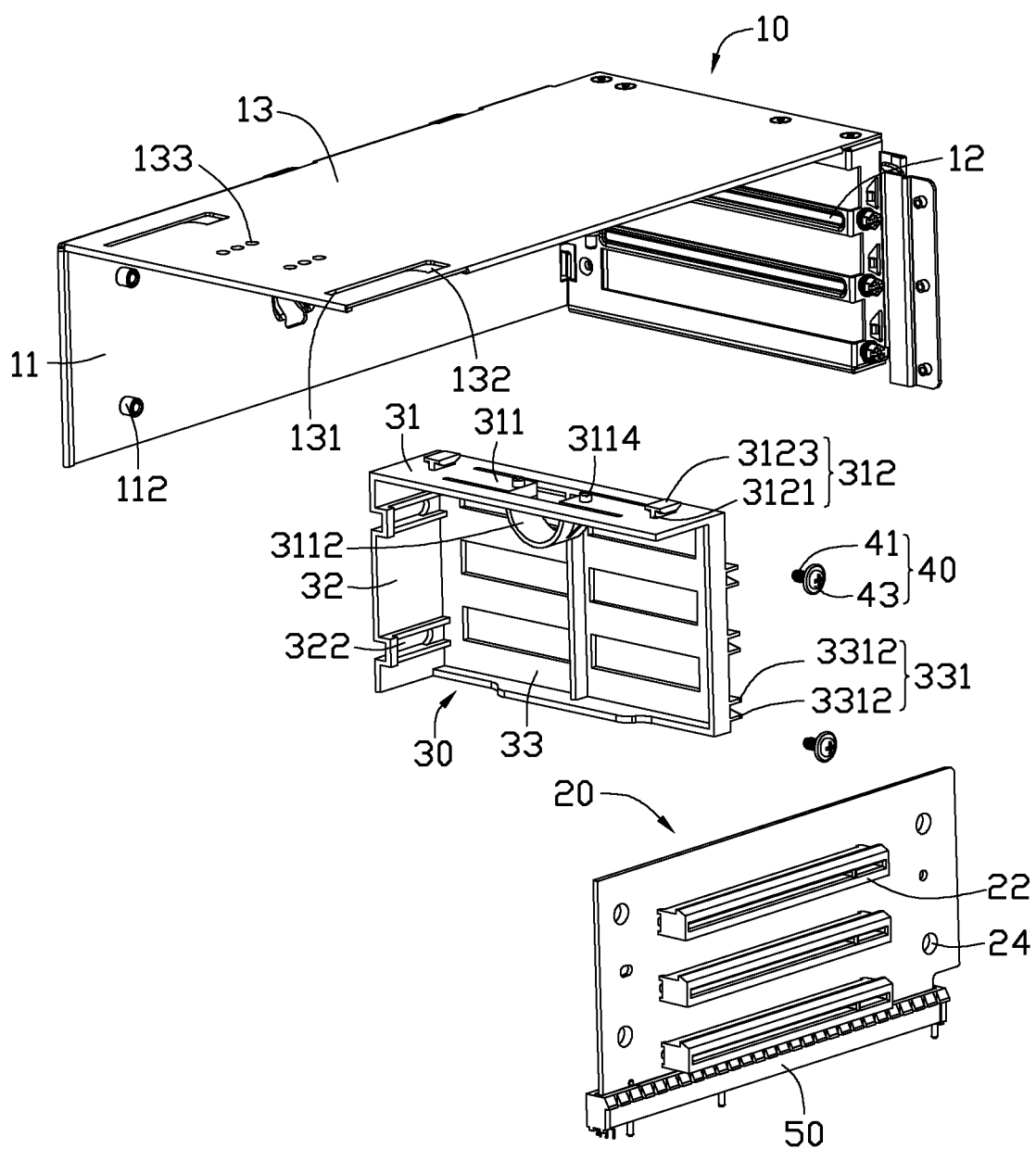
FIG. 1 is an exploded, isometric view of an exemplary embodiment of a mounting apparatus for expansion cards.

Referring to FIG. 1, an exemplary embodiment of a mounting apparatus includes a fixing bracket 10, a switch card 20, a supporting member 30, and two connecting members 40.

The fixing bracket 10 includes a side plate 11, an end plate 12 perpendicularly extending from a first end of the side plate 11, and a top plate 13 perpendicularly connected to the top of the side plate 11 and the top of the end plate 12. Two internally threaded standoffs 112 extend from the side plate 11, adjacent to a second end of the side plate 11, away from the end plate 12. The top plate 13 defines two parallel first slide slots 131 extending along a direction perpendicular to the end plate 12, two access holes 132, and a plurality of positioning holes 133 between the first slide slots 131. The access holes 132 are arranged at the ends of the first slide slots 131 adjacent to the end plate 12, and communicated with the corresponding first slot slots 131. The positioning holes 133 are arrayed in two rows parallel to the first slide slots 131. The number of the positioning holes 133 in each row is three.

The switch card 20 defines a plurality of fixing holes 24, and includes a plurality of expansion slots 22.

The supporting member 30 includes a first mounting wall 31, a second mounting wall 32 perpendicularly extending down from an end of the first mounting wall 31, and a support wall 33 perpendicularly extending down from a side of the first mounting wall 31 and perpendicularly connected to a neighboring side of the second mounting wall 32. The first mounting wall 31 includes two tongue-shaped resilient tabs 311, and two T-shaped guiding protrusions 312 extending upwards from the first mounting wall 31 at opposite ends of the resilient tabs 311. An arc-shaped manipulation portion 3112 is connected between two adjacent distal ends of the resilient tabs 311, and extends downwards. A positioning pin 3114 extends up from each resilient tab 311, adjacent to the distal end of each. Each of the guiding protrusions 312 includes a slide portion 3121 supported by the first mounting wall 31 and a stop portion 3123 formed on a top of the slide portion 3121. A width of the stop portion 3123 is larger than a width of the slide portion 3121. The second mounting wall 32 defines two parallel second slide slots 322 extending along a direction perpendicular to the support wall 33. The support wall 33 includes a plurality of holding portions 331, each including two parallel holding pieces 3312 formed on a side of the support wall 33 opposite to the first mounting wall 31. The lengthwise direction of the holding pieces 3312 is perpendicular to the second mounting wall 32.

Each of the connecting members 40 includes a threaded pole 41 and a head 43 at each end of the threaded pole 41.

Figure 2:
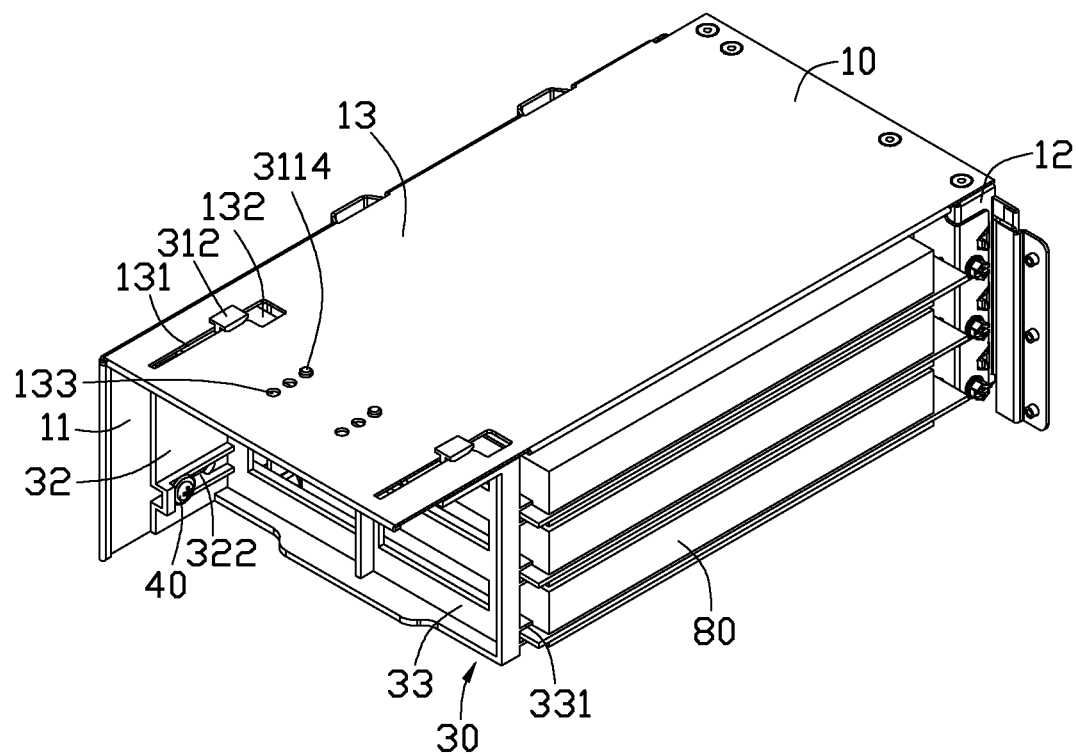
FIG. 2 is an assembled, isometric view of an exemplary embodiment of the mounting apparatus of FIG. 1 and a plurality of first expansion cards.
Figure 3:
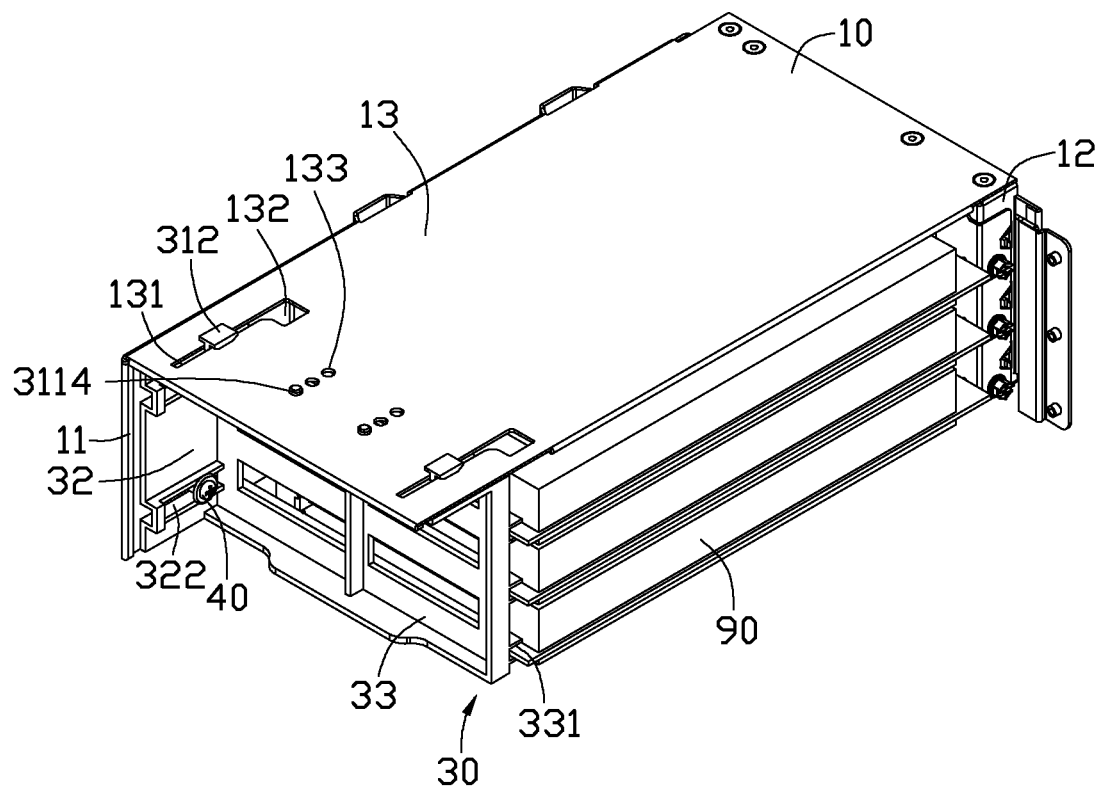
FIG. 3 is an assembled, isometric view of the mounting apparatus of FIG. 1 and a plurality of second expansion cards.

Referring to FIG. 2, in assembly, the switch card 20 is fixed to an inner side of the side plate 11, with a plurality of screws extending through the fixing holes 24 and fastened to the side plate 11. The supporting member 30 is received in the fixing bracket 10, with the guiding protrusions 312 in the access holes 132. The slide portions 3121 are manipulated into the first slide slots 131 to make the standoffs 112 enter the corresponding second slide slots 322, thereby slidably mounting the supporting member 30 to the fixing bracket 10. The screw poles 41 of the connecting members 40 engage in the standoffs 112 to prevent disengagement of the standoffs 112 from the corresponding second slide slot 322. The support wall 33 is substantially parallel to the end plate 12, with the holding portions 331 facing the end plate 12.

With the supporting member 30 able to slide, each positioning pin 3114 is engaged in a chosen positioning hole 133 of a corresponding row, thereby locating the supporting member 30.

Referring to FIG. 2, in mounting a plurality of expansion cards 80 of a certain first length, each expansion card 80 is received in the fixing bracket 10 and connected to an expansion slot 22. The rear end of each expansion card 80 is secured to the end plate 12. The positioning pins 3114 engage in the positioning holes 133 to locate the supporting member 30 in a certain position, where the front end of each first expansion card 80 is sandwiched between the holding pieces 3312 of the holding portions 331 to prevent the first expansion card 80 from sagging.

Figure 4:
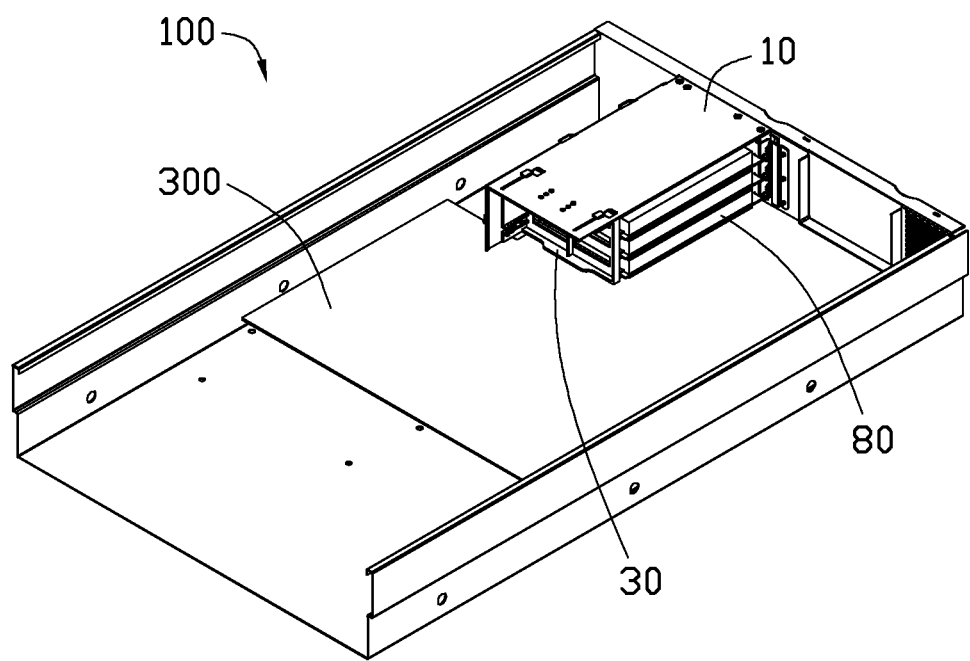
FIG. 4 is an assembled, isometric view of the mounting apparatus and the expansion cards of FIG. 2 mounted to a chassis.

Referring to FIG. 4, in assembling a plurality of expansion cards 90 of a certain second length, having a larger length than the first-length expansion cards 80, the manipulation portion 3112 is driven downwards to deform the resilient tabs 311, thereby disengaging the positioning pins 3114 from the positioning holes 133. The supporting member 30 is slid away from the end plate 12, until the distance between the supporting member 30 and the end plate 12 is substantially equal to the length of the second-length expansion cards 90. The manipulation portion 3112 is released, and therefore, the resilient tabs 311 are restored to engage the positioning pins 3114 in two different and suitable positioning holes 133, to locate the supporting member 30. Each of the second-length expansion cards 90 is received in the fixing bracket 10 and connected to an expansion slot 22. The rear end of the expansion card 90 is secured to the end plate 12. The front end of each expansion card 90 is sandwiched between the holding pieces 3312 of the holding portions 331 to also prevent the second-length expansion card 90 from sagging.

Referring to FIG. 4, the fixing bracket 10 can be fixed to a chassis 100 of a server by screwing, or other general fastening means, and the switch card 20 is electrically connected to an expansion slot 50 of a mother board 300 which may be mounted in the chassis 100.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting apparatus to selectively fix expansion cards with different lengths, the mounting apparatus comprising:
    a fixing bracket comprising an end plate for fixing first ends of the expansion cards, and a top plate perpendicularly extending forward from a top end of the end plate, the top plate defining a plurality of positioning holes with different distances from the end plate;
    a supporting member mounted to the fixing bracket, and slidable in a direction perpendicular to the end plate, the supporting member comprising a support wall, and a first mounting wall perpendicularly extending forwards from a side of the support wall, a positioning pin extending up from the first mounting wall to be selectively engaged in one of the positioning holes to position the supporting member, thereby allowing the support wall to hold a second end, opposite to the first end, of one of the expansion cards with a corresponding length; and
    a connecting member;
    wherein the fixing bracket further comprises a side plate perpendicularly connected to the end plate and the top plate, a standoff extends from the side plate, the supporting member further comprises a second mounting wall perpendicularly connected to the support wall and the first mounting wall, the second mounting wall further defines a second slide slot, the standoff is slidably received in the second slide slot of the supporting member, the connecting member is fastened to the standoff to prevent the standoff from disengaging from the second slide slot.

2. The mounting apparatus of claim 1, wherein the positioning holes are arrayed in a row parallel to the slide direction of the supporting member.

3. The mounting apparatus of claim 1, wherein the top plate of the bracket defines a first slide slot, a guiding protrusion extends up from the first mounting wall of the supporting member and is slidably received in the first slide slot.

4. The mounting apparatus of claim 3, wherein the guiding protrusion is substantially T-shaped, and comprises a slide portion extending from the first mounting wall and slidably received in the first slide slot, and a stop portion formed on a top end of the slide portion and prevented from entering the first slide slot, the top plate of the fixing bracket further defines an access hole communicating with the first slide slot and accessible for the stop portion of the guiding protrusion.

5. The mounting apparatus of claim 1, wherein the first mounting wall of the supporting member comprises a resilient tab, the positioning pin extends up from the resilient tab.

6. The mounting apparatus of claim 5, wherein a manipulation portion protrudes from the resilient tab.

7. The mounting apparatus of claim 1, wherein the standoff is internally threaded, the connecting member comprising a threaded pole engaged in the standoff, and a head formed on a distal end of the threaded pole.

8. The mounting apparatus of claim 1, wherein the support wall comprises a holding portion to hold front ends of the expansion cards.

9. The mounting apparatus of claim 8, wherein the holding portion comprises two parallel holding pieces to sandwich the front ends of the expansion cards.

\* \* \* \* \*